Jan. 19, 1937.                    W. R. TOMLIN                    2,068,580
                            AUTOMOBILE LIGHTING SYSTEM
                               Filed Dec. 10, 1934
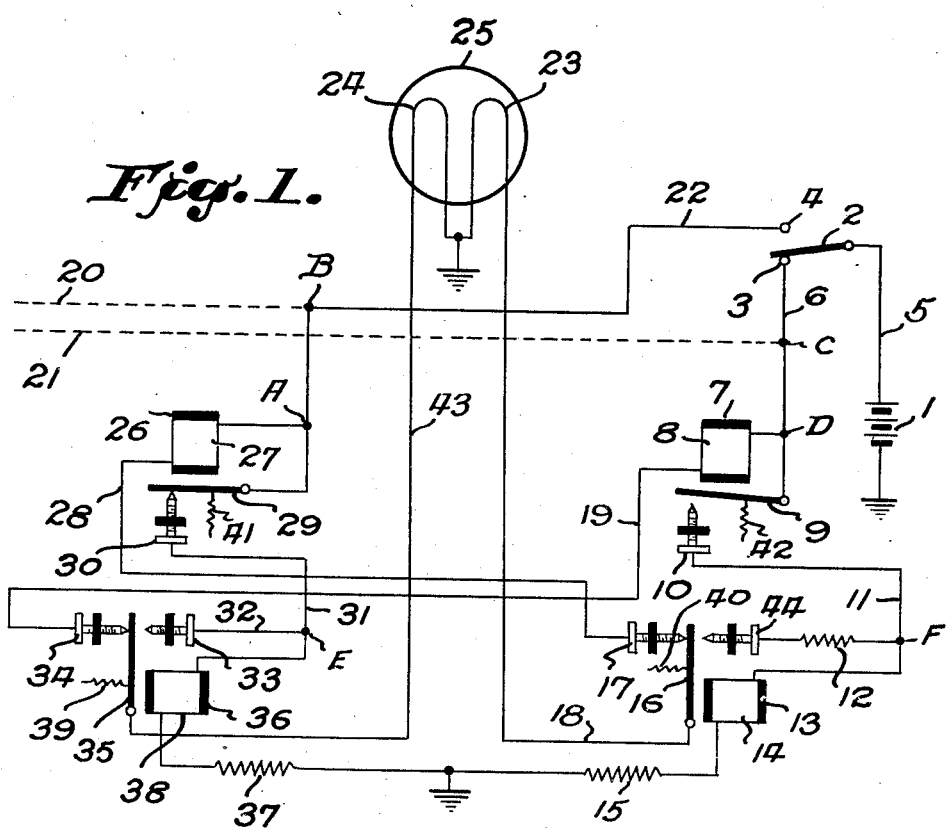
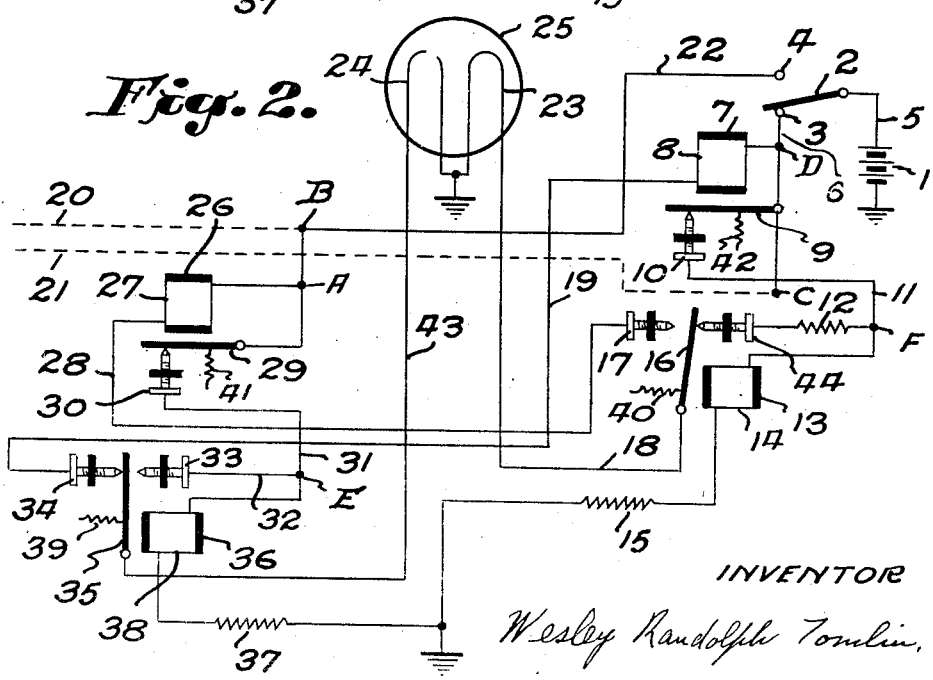
INVENTOR
Wesley Randolph Tomlin.

Patented Jan. 19, 1937

2,068,580

UNITED STATES PATENT OFFICE 2,068,580

AUTOMOBILE LIGHTING SYSTEM

Wesley Randolph Tomlin, Fort Collins, Colo.

Application December 10, 1934, Serial No. 756,826

11 Claims. (Cl. 171—97)

My invention relates to improvements in electrical lighting systems, especially adapted for use in automobile lighting. The object of the improvement is to provide a system whereby an automobile two-filament headlight will function in the event one of said filaments of said headlight is broken or becomes defective, likewise it may be used as a means for substituting the stop light for the taillight in event taillight becomes defective or vice versa.

In its use and adaptation in an automobile lighting system, it provides protection in regard to law and provides an added degree of safety both to the occupants of the automobile and approaching automobiles, by providing two headlights in the event one filament of either headlight becomes defective, and providing a substitute taillight in the event the taillight ceases to function.

The usefulness and adaptation of the invention will be more readily understood by the inspection of the accompanying drawing, the scope of the invention being indicated in the appending claims, the following being a brief description of the drawing.

Fig. 1 is a diagrammatic illustration of the system during normal operation, and Fig. 2 is a diagrammatic illustration of the system upon failure of one filament.

Figures 1 and 2 of the accompanying drawing show a diagrammatic view of one headlamp bulb containing two filaments, a source of electric current which commonly and generally used in an automobile is a storage battery, a manually controlled electric switch for selectively connecting the current source to either of the said filaments, electromagnetic switches automatically operable by the normal illumination of either of said filaments and electromagnetic switches automatically operable by an interruption of the normal flow of electric current thru either of said filaments. One pole of the current source and one side of each filament is shown as grounded to the frame of the automobile, the circuit being completed by electrically connecting the opposite pole of the current source to the ungrounded side of either filament.

Only one headlight is shown but the connections to the second headlight are shown by the dotted lines 20 and 21 connecting at points B and C. The same type of apparatus is required for each headlight, also if used in combination with the taillight and stop light.

The following is a detailed description of the units as shown in the drawing. The source of current 1 is a storage battery, 2 is a manually operated switch for selectively illuminating the desired filament by making engagement with one of either stationary contacts 3 or 4, an electromagnet 7 is energized by an uninterrupted flow of electric current thru the winding 8, an armature 9 normally engaged in contact with stationary contact 10 by means of the tension of spring 42 is attracted toward 7 by the energization of electromagnet 7. This operation as shown in Figure 1 takes place only when the switch 2 is engaged with contact 3 and the dimmer filament 24 of the head lamp bulb 25 is normal and functioning. An electromagnet 26 is energized by an uninterrupted flow of electric current thru the winding 27, an armature 29 normally engaged in contact with stationary contact 30 by means of the tension of spring 41 is attracted toward 26 by the energization of electromagnet 26. This operation (not shown) takes place only when the switch 2 is engaged in contact with stationary contact 4 and the bright filament 23 of the headlamp bulb 25 is normal and functioning. An electromagnet 13 is energized by an uninterrupted flow of electric current thru winding 14. An armature 16 normally engaged in contact with contact point 17 by means of the tension of spring 40 as shown in Figure 1 is attracted toward electromagnet 13 upon the energization of 13, this operation as shown in Figure 2 causes armature 16 to engage in contact with stationary contact 44. An electromagnet 36 is energized by an uninterrupted flow of electric current thru winding 38. An armature 35 normally engaged in contact with stationary contact point 34 by means of the tension of spring 39 as shown in Figures 1 and 2, is attracted toward electromagnet 36 upon the energization of 36, this operation (not shown) causes armature 39 to engage in contact with contact point 33. A resistance 15 placed in the circuit thru the winding 14 is so designed to permit sufficient current to pass for the energization of electromagnet 14 sufficiently to attract armature 16 but of high enough resistance to retain sufficient current delivered from contact 3 for the illumination of the headlamp bright filament 23 as shown in Figure 2. Likewise a resistance 37 placed in the circuit thru the winding 38 is so designed to permit sufficient current to pass for the energization of electromagnet 36 sufficiently to attract armature 35 but of high enough resistance to retain sufficient current delivered from contact 4 for the illumination of the headlamp dimmer filament 24, a resistance 12 is placed in the circuit between contact points 10 and 44 for the purpose of dimming the bright filament 23 only when the bright filament 23 is illuminated as a substitute for a broken dimmer filament 24 as shown in Figure 2.

In the operation of the apparatus as shown in Figure 1 the switch 2 is engaged in contact with contact point 3, thus closing the circuit from battery 1 thru wire 5, switch 2, contact point 3 and wire 6 to point D thru winding 8 and wire 19 to contact point 34, thence thru armature 35 and wire 43 to dimmer filament 24 thereby illuminating dimmer filament 24. This circuit thru winding 8 energizes electromagnet 7 thereby attracting armature 9 towards 7. This disengages contact between armature 9 and contact point 10. In event the dimmer filament 24 breaks or ceases to function normally, as shown in Figure 2, the circuit thru winding 8 is opened and electromagnet 7 no longer being energized releases its attraction for armature 9. Armature 9 then by means of the tension of spring 42 returns to normal position and engages in contact with contact point 10. Electric current then is transmitted from point 3 thru wire 6 to point D, thence to armature 9, thru contact point 10 and wire 11 to point F thru winding 14 and resistance 15 to ground, thus completing the circuit thru winding 14. This operation energizes electromagnet 13 which attracts armature 16, thereby causing armature 16 to disengage contact with contact point 17 also armature 16 engages in contact with contact point 44. Electric current then is delivered from F thru resistance 12 to contact point 44, thence thru armature 16 and wire 18 to bright filament 23 thereby illuminating bright filament 23. As the control switch 2 is positioned for a desired dimmer light the resistance 12 is placed in this circuit for dimming the bright filament only when it is substituted for the dimmer filament. The electrical contact between armature 16 and point 17 being opened, electric current cannot enter the opposite main circuit. In normally illuminating the bright filament 23, the description is as follows although not illustrated in the drawing, is similar to Figure 1, except the control switch 2 is engaged in contact with contact point 4. This closes the circuit from battery 1, thu wire 5 to switch 2 thru contact point 4 and wire 22 to point A thru winding 27 and wire 28 to contact point 17 thru armature 16 and wire 18 to bright filament 23 thereby illuminating 23. This circuit thru winding 27 energizes electromagnet 26 thereby attracting armature 29 towards 26. This disengages contact between armature 29 and contact point 30. In event the bright filament 23 breaks or ceases to function normally the circuit thru winding 27 is opened and electro-magnet 26 no longer being energized, releases its attraction for armature 29. Armature 29 then by means of the tension of spring 41 returns to normal position and engages in contact with contact point 30. Electric current then is transmitted from contact 4 thru wire 22 to point A, thence to armature 29, thru contact point 30 and wire 31 to point E, thru winding 38 and resistance 37 to ground thus completing the circuit thru winding 38. This operation energizes electromagnet 36 which attracts armature 35, thereby causing armature 35 to disengage contact with contact point 34, also armature 35 engages in contact with contact point 33. Electric current then is delivered from E thru wire 32 to contact point 33, thence thru armature 35 and wire 43 to dimmer filament 24. As the control switch 2 is positioned for a desired bright light and the dimmer filament is substituted for the defective bright filament no resistance is placed between contact point 30 and contact point 33 and the dimmer filament 24 is illuminated to its fullest capacity.

In operating this system in conjunction with a taillight and stop light the same type of apparatus may be employed and instead of one control switch 2 as shown in Figures 1 and 2 a control switch is positioned for selective engagement with only one of the stationary contacts for normal illumination of the taillight and a second control switch is positioned for selective engagement with only the other stationary contact for normal illumination of the stop light.

In the use of this system it may be used with the usual type of control switches now used in automobiles as the apparatus is a unit that may be installed in any automobile using double filament headlamp bulbs.

A signal for the information of the driver concerning the condition of each lamp bulb may be placed in a convenient position on the instrument board, said signal being operated by an uninterrupted flow of electric current thru either winding 14 of electromagnet 13 or winding 38 of electromagnet 36.

It may be noted that the windings 8 and 27 should be only of sufficient capacity for energizing their respective electromagnets as the current, passing thru these windings is used to illuminate the filaments, and an excess amount of winding would decrease the amount of illumination.

Also the windings 14 and 38 may be considerably more than the required amount for energizing their respective electromagnets as the circuit thru these windings is used only for operating electromagnetic switches. It may be noted also the amount of resistance 15 depends upon the capacity of winding 14 and the amount of resistance 37 depends upon the capacity of winding 38.

The apparatus as described is especially adaptable in automobile lighting systems, however it may be used in any other system where two current consuming devices may be installed in such a way that either will automatically function in the event the other device becomes defective and ceases to function.

I claim:

1. In an electric lighting system for automobiles, a headlight system consisting of one or more headlights, an electric lamp bulb for each of said headlights, said lamp bulb having two filaments, a source of current for said filaments, one end of each of said filaments being electrically connected to one pole of said current source, a main electric switch having two stationary contacts and a movable contact, said movable contact being electrically connected to the opposite pole of said current source, said movable contact being selectively movable into and out of engagement with either of said stationary contacts, a main circuit for each of said filaments, a secondary circuit associated with each of said main circuits, each of said main circuits and its associated secondary circuit being electrically connected to one of said stationary contacts of the main switch, each of said main circuits being completed thru its associated filament. and each secondary circuit being completed by electrical connection to the opposite pole of the current source; a normally closed auxiliary switch in each of said secondary circuits, said switch being opened by an electrically operated device actuated by an uninterrupted flow of electric current thru its associated main circuit, an auxiliary electric switch in each main circuit, said switch having a movable contact electrically connected to its associated filament and when in normal position closes said main circuit, said movable contact being actuated by means of an electrically operated device, said device being energized by an uninterrupted flow of electric current thru the secondary circuit associated with the opposite main circuit, said switch when actuated opens said main circuit thru its associated filament and by means of a stationary contact positioned for engagement with the movable contact of said switch when actuated electrically connects said movable contact to an energized auxiliary circuit of the secondary circuit associated with the opposite main circuit.

2. In an electric lighting system for automobiles, a headlight system consisting of one or more headlights, an electric lamp bulb for each of said headlights, said lamp bulb having two filaments, a source of current for said filaments, one end of each of said filaments being electrically connected to one pole of said current source, a main electric switch having two stationary contacts and a movable contact, said movable contact being electrically connected to the opposite pole of said current source, said movable contact being selectively movable into and out of engagement with either of said stationary contacts, a main circuit for each of said filaments, a secondary circuit associated with each of said main circuits, each of said main circuits and its associated secondary circuit being electrically connected to one of said stationary contacts of the main switch, each of said main circuits being completed thru its associated filament, and each secondary circuit being completed by electrical connection to the opposite pole of the current source; a normally closed auxiliary switch in each main circuit, means for opening said switch associated with either of said main circuits when the opposite main circuit is electrically connected to the current source and the flow of electric current is interrupted thru the opposite circuit.

3. In an electric lighting system for automobiles, a headlight system consisting of one or more headlights, an electric lamp bulb for each of said headlights, said lamp bulb having two filaments, a source of current for said filaments, one end of each of said filaments being electrically connected to one pole of said current source, a main electric switch having two stationary contacts and a movable contact, said movable contact being electrically connected to the opposite pole of said current source, said movable contact being selectively movable into and out of engagement with either of said stationary contacts, a main circuit for each of said filaments, a secondary circuit associated with each of said main circuits, each of said main circuits and its associated secondary circuit being electrically connected to one of said stationary contacts of the main switch, each of said main circuits being completed thru its associated filament, and each secondary circuit being completed by electrical connection to the opposite pole of the current source; an auxiliary switch in each main circuit, said switch of either main circuit being actuated by means of an uninterrupted flow of electric current thru the secondary circuit associated with the opposite main circuit when said opposite main circuit is electrically connected to the current source and the flow of current is interrupted by means of its associated filament being broken or ceasing to function; said auxiliary switch having a movable contact electrically connected to its associated filament and normally closes its associated main circuit; also when actuated, said movable contact electrically connects an energized auxiliary circuit of the secondary circuit connected to the current source to the filament normally associated with the opposite main circuit.

4. In an electric lighting system for automobiles, a headlight system consisting of one or more headlights, an electric lamp bulb for each of said headlights, said lamp bulb having two filaments, a source of current for said filaments, one end of each of said filaments being electrically connected to one pole of said current source, a main electric switch having two stationary contacts and a movable contact, said movable contact being electrically connected to the opposite pole of said current source, said movable contact being selectively movable into and out of engagement with either of said stationary contacts, a main circuit for each of said filaments, a secondary circuit associated with each of said main circuits, each of said main circuits and its associated secondary circuit being electrically connected to one of said stationary contacts of the main switch, each of said main circuits being completed thru its associated filament, and each secondary circuit being completed by electrical connection to the opposite pole of the current source; operative means for connecting either filament to an energized auxiliary secondary circuit when the main switch is positioned to illuminate the opposite filament and said opposite filament breaks or ceases to function.

5. In an electric lighting system for automobiles, a headlight system consisting of one or more headlights, an electric lamp bulb for each of said headlights, said lamp bulb having two filaments, one of said filaments termed a bright filament and the other termed a dimmer filament, a source of current for said filaments, one end of each of said filaments being electrically connected to one pole of said current source, a main electric switch having two stationary contacts and a movable contact, said movable contact being electrically connected to the other pole of the current source and being selectively movable into and out of engagement with either of said stationary contacts, a main bright circuit and a main dimmer circuit, a secondary circuit associated with each of said main circuits, one of said main circuits and its associated secondary circuit being electrically connected to one of said stationary contacts, the other of said main circuits and its associated secondary circuit being electrically connected to the other of said stationary contacts, said main bright circuit electrically connecting its associated stationary contact to the bright filament and said main dimmer circuit electrically connecting its associated stationary contact to the dimmer filament, each of said secondary circuits electrically connecting its associated stationary contact of the main switch to the opposite pole of the current source, means for connecting either filament to an energized auxiliary secondary circuit when the main switch is positioned to illuminate the opposite filament and said opposite filament breaks or ceases to function, a resistance placed in the auxiliary secondary circuit associated with the main dimmer circuit, said resistance being means for dimming the bright filament in event the main switch is positioned for normally illuminating the dimmer filament and said dimmer filament breaks or ceases to function.

6. In combination, two main electrical circuits, a current consuming device in each of said main circuits, a secondary electrical circuit associated with each of said main circuits, a current consuming device in each of said secondary circuits, a source of current for energizing each of said main circuits and each of said secondary circuits and their respective current consuming devices, main switching means for selectively connecting either of said main circuits and its associated secondary circuit with the current source, a normally closed auxiliary switch in each secondary circuit, an electromagnetic device associated with each main circuit, said device by means of an uninterrupted flow of current thru one of said main circuits opens the auxiliary switch in the associated secondary circuit.

7. In combination, two main electrical circuits, a current consuming device in each of said main circuits, a secondary electrical circuit associated with each of said main circuits, a current consuming device in each of said secondary circuits, a source of current for energizing each of said main circuits and each of said secondary circuits and their respective current consuming devices, main switching means for selectively connecting either of said main circuits and its associated secondary circuit with the current source, a normally closed auxiliary switch in each secondary circuit, an electromagnetic device associated with each main circuit, said device by means of an uninterrupted flow of current thru one of said main circuits opens the auxiliary switch in the associated secondary circuit, a normally closed auxiliary switch in each main circuit, said auxiliary switch having a movable contact, said movable contact being actuated and opening said auxiliary switch by means of the current consuming device in the secondary circuit not associated with its said main circuit.

8. In combination, two main electrical circuits, a current consuming device in each of said main circuits, a secondary electrical circuit associated with each of said main circuits, a current consuming device in each of said secondary circuits, a source of current for energizing each of said main circuits and each of said secondary circuits and their respective current consuming devices, main switching means for selectively connecting either of said main circuits and its associated secondary circuit with the current source, a normally closed auxiliary switch in each secondary circuit, an electromagnetic device associated with each main circuit, said device by means of an uninterrupted flow of current thru one of said main circuits opens the auxiliary switch in the associated secondary circuit, a normally closed auxiliary switch in each main circuit, said auxiliary switch having a movable contact, said movable contact being actuated and opening said auxiliary switch by means of the current consuming device in the secondary circuit not associated with its said main circuit, a subsequent circuit associated with each secondary circuit, said subsequent circuit leading from its associated secondary circuit to a point positioned to make engagement with the movable contact of the auxiliary switch in the opposite main circuit, said subsequent circuit when closed electrically connects its associated secondary circuit to the current consuming device in the opposite main circuit.

9. In an electric lighting system, two electric lamp bulbs, each of said lamp bulbs having one filament, a main circuit for each of said filaments, a source of current for said filaments, one end of each of said filaments being electrically connected to one pole of said current source, a normally opened main switch electrically connected to the opposite pole of the current source for connecting each of said filaments separately or simultaneously to the current source, a bridge circuit interconnecting said main circuits, two normally closed auxiliary switches positioned in series with said bridge circuit, one of said auxiliary switches being opened by an electrically operated switch opening device associated with one main circuit, the other of said auxiliary switches being opened by an electrically operated switch opening device associated with the opposite main circuit, said bridge circuit leading from a point in one of said main circuits between the main switch and the switch opening device thru both auxiliary switches to a point in the opposite main circuit between the filament and the switch opening device.

10. In an electric lighting system, two electric lamp bulbs, each of said lamp bulbs having one filament, a main circuit for each of said filaments, a source of current for said filaments, one end of each of said filaments being electrically connected to one pole of said current source, a normally opened main switch, electrically connected to the opposite pole of the current source for connecting each of said filaments separately or simultaneously to the current source, a bridge circuit interconnecting said main circuits, two normally closed auxiliary switches positioned in series with said bridge circuit, means for opening the bridge circuit when either or both of said main switches is closed and the flow of current is not interrupted thru either or both of said main circuits.

11. In combination two main electrical circuits, a source of current, a main switch associated with each main circuit for selectively connecting said main circuit to one pole of said current source, a current consuming device associated with each main circuit, said device being electrically connected to the opposite pole of said current source, an electromagnet, said magnet having a common core and two windings, one of said windings being in one of said main circuits and the other of said windings being in the opposite main circuit, said windings being in the same direction on the core and provide the same magnetic polarity when energized separately or simultaneously, a normally closed auxiliary switch having one stationary contact and one movable contact said switch being opened by the energization of said electromagnet, a bridge circuit interconnecting said main circuits, said bridge circuit leading from a point in one of said main circuits between the main switch and its associated winding on the electro-magnet thru the auxiliary switch to a point in the opposite main circuit between the current consuming device and its associated winding on the electromagnet.

WESLEY RANDOLPH TOMLIN.